E. J. KROEGER.
BATTERY JAR MOLD.
APPLICATION FILED NOV. 21, 1918.

1,296,092.

Patented Mar. 4, 1919.
2 SHEETS—SHEET 1.

Inventor
Edwin J. Kroeger
By Robert M. Pierson
Atty.

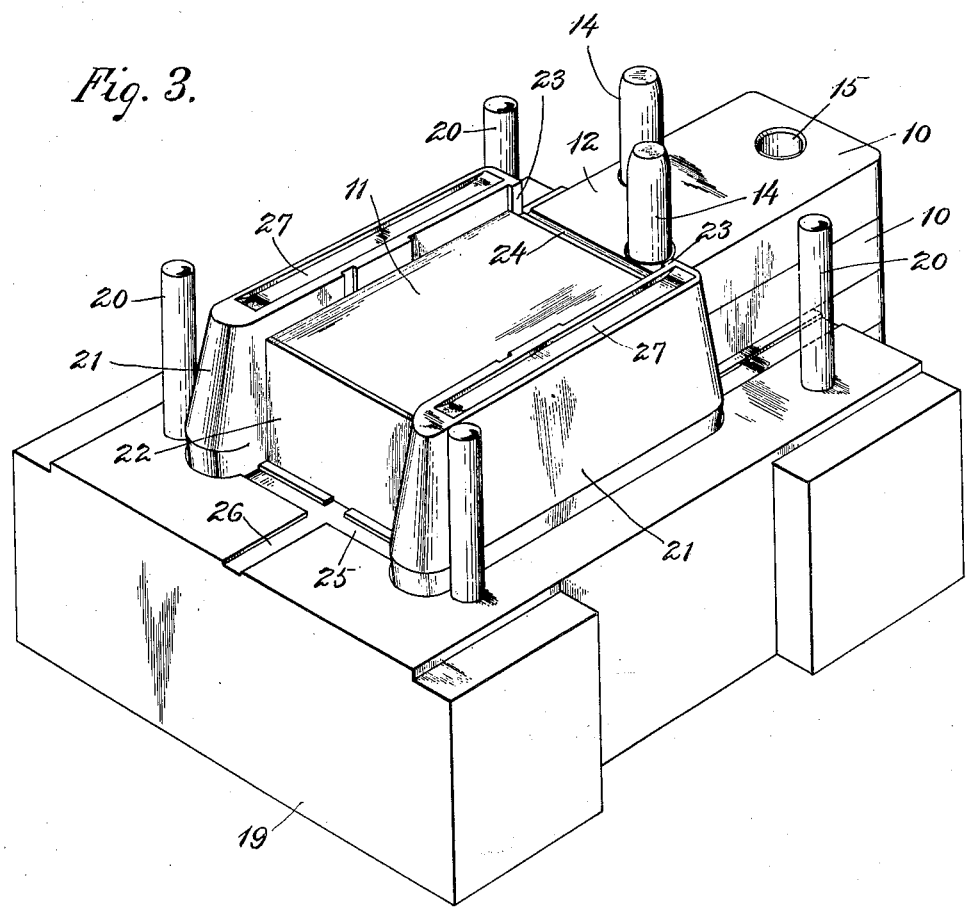

UNITED STATES PATENT OFFICE.

EDWIN J. KROEGER, OF AKRON, OHIO, ASSIGNOR TO THE B. F. GOODRICH COMPANY, OF NEW YORK, N. Y., A CORPORATION OF NEW YORK.

BATTERY-JAR MOLD.

1,296,092.   Specification of Letters Patent.   Patented Mar. 4, 1919.

Application filed November 21, 1918. Serial No. 263,499.

*To all whom it may concern:*

Be it known that I, EDWIN J. KROEGER, a citizen of the United States, residing at Akron, in the county of Summit and State of Ohio, have invented a certain new and useful Battery-Jar Mold, of which the following is a specification.

This invention relates to the art of molding jars of plastic material, and more particularly hard-rubber storage-battery jars provided with one or more partitions dividing their interior space into a plurality of compartments. Owing to the necessity of securing a proper union between the partitions and the side walls, the small tolerances allowed for external dimensions, etc., it is customary to vulcanize these compartment jars on mandrels in an outer mold, as distinguished from the moldless mandrel, open-heat curing method commonly used with single-compartment battery jars. The outer molds as heretofore used have been made in two parts only, each containing half of the molding cavity, and since the sides were integral with the far wall of the pocket in each half, the desired pressure at the partition seams could not be obtained without causing a flow of the stock. Largely owing to the presence of the lubricant used on the mandrels and outer mold parts, the old method produced large numbers of defective jars having imperfect joints or seams, and furthermore it required the use of a relatively large amount of rubber in order to secure the proper distribution of stock to all points.

My object is to avoid these defects by providing an outer vulcanizing mold which will exert direct compression edgewise of the jar partitions, preferably a mold all four sides of which will relatively contract against the work during closure of the mold, thus avoiding excessive flow of stock and lubricant, securing a greater percentage of perfect joints or seams, permitting the use of thinner stock, and enabling the stock to be more quickly assembled with the mandrels.

Of the accompanying drawings,

Fig. 3 is a perspective view of the assembled mold and work with the upper half of the mold removed.

Figure 1:
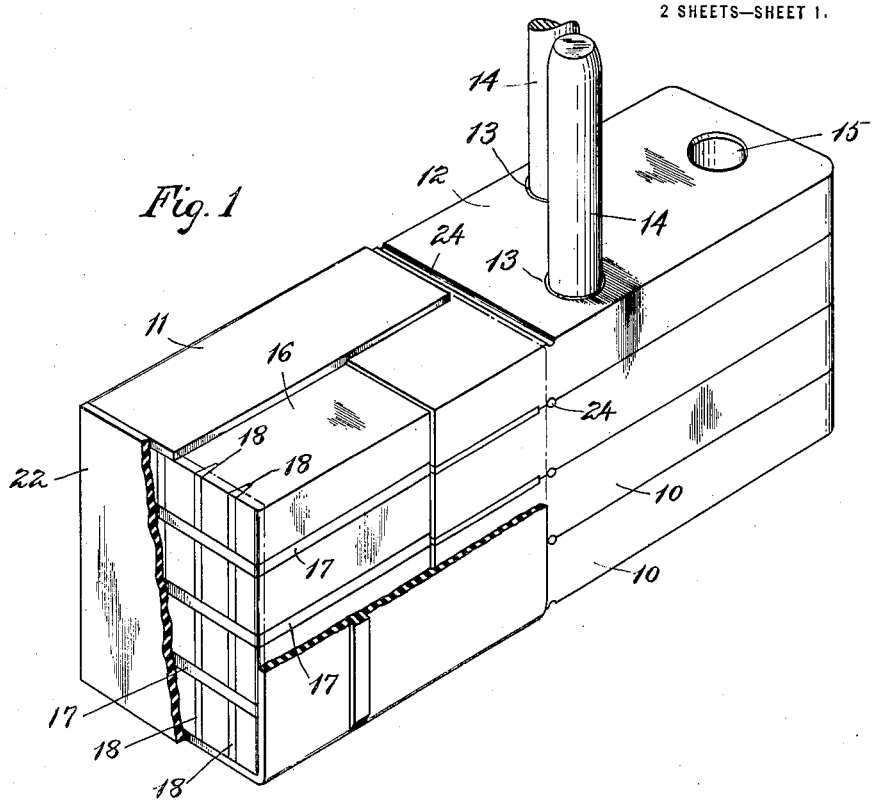
Figure 1 is a perspective view, partly in section, showing the mandrels and jar stock assembled therewith for making a four-compartment battery jar.

In the drawings 10, 10 are the members of a set of mandrels or formers for making a four-compartment battery jar 11, these mandrels having supporting portions 12 external to the jar and the molding cavity of the outer mold, but supported by said mold and formed with holes 13 for the alining pins or dowels 14 and another hole 15 for the handling hook, the pins 14 being adapted to project above and below the stack of mandrels and enter sockets in the two halves of the outer mold in the usual way. The molding portions 16 of the mandrels are spaced apart to receive the jar partitions 17, and are recessed at the bottom ends for the battery-plate supporting lugs 18.

19, 19 are the two body members or halves of the outer mold which are maintained in alinement by dowels 20, as clearly seen in Fig. 3 which shows the assembled parts without the upper mold half.

Each mold member 19 is formed with one-half of the jar-molding cavity, and is further recessed at the sides in accordance with my invention to receive a pair of side-pressing mold members 21 which project equally into the pockets in the two body members 19 when the mold is closed. The work-engaging faces of the members 21 are parallel with the narrow side faces of the mandrels 10, and are suitably formed to give the desired exterior configuration to the sides of the jar. They are substantially of the same width as the stack of mandrels, but are of greater length than the jar 11 and arranged to project beyond the latter at both ends, the projection at the closed end serving to confine the two vertical edges of the jar bottom 22, while the two horizontal edges thereof are confined by the mold members 19. At the open end of the jar the members 21 are formed with the flanges 23 overhanging the jar-wall spaces so as to mold the vertical side edges of the jar at the mouth of the latter, the mold members 17 having the usual corresponding overhang (not shown) for molding the two horizontal jar-mouth edges. The mandrels are formed with overflow grooves 24 adjacent and parallel to the mouth edges of the partitions and of the two horizontal jar walls. The body members 19 are likewise grooved at 25, 26 to provide for overflow at the bottom of the jar, and the longitudinal edges of the members 21 are grooved or recessed at 27 to provide for overflow at these points.

Figure 2:
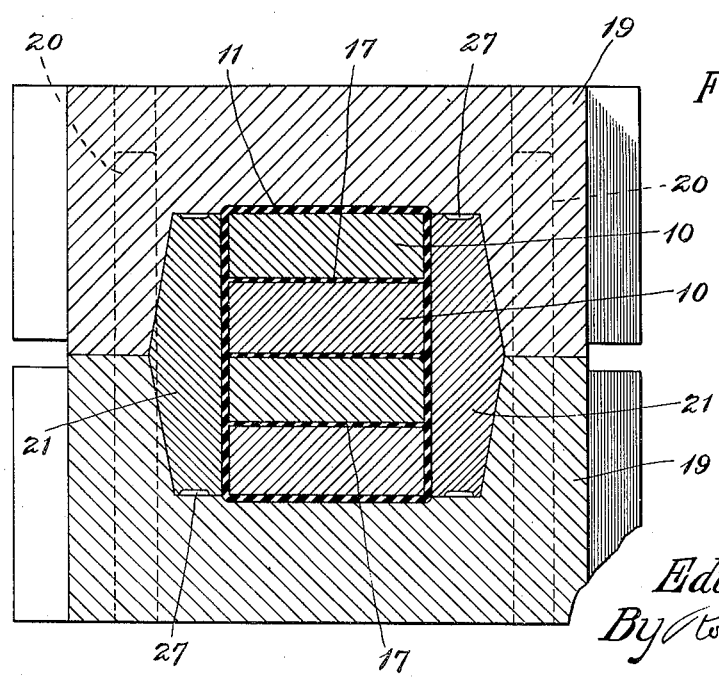
Fig. 2 is a cross-sectional view showing the mold closed upon the work.

Each mold member 21 on its back and its two projecting ends is tapered in opposite directions, from a middle plane of maximum width and length, to its upper and lower edge planes, so that each member has the form of a pair of wedges joined by their bases. It is preferred to make the two wedges integral as shown, although this is not essential. The mold members 19 are complementally wedge-formed so that when brought together as shown in Fig. 2 they properly aline the mold members 21 longitudinally, and also force them inwardly against the work in a direction edgewise of the partitions 17.

In operating my improved mold, the stock is assembled with the mandrels, as indicated in Fig. 1, entirely outside of the outer mold members, which saves considerable time in the assembling over the method required in connection with the old type of outer mold, according to which it was necessary to lay the side-forming sheet of stock upon the lower member of said outer mold, depress the middle of said sheet into the pocket thereof, then lay the bottom-forming sheet on said mold member with its lower half in the pocket, and then build up the stack of mandrels and the remaining parts of the jar within and above said lower mold member. According to the present plan, the side-forming sheet of stock is spread out flat on a table, the lowermost mandrel 10 placed in the middle thereof, the lugs 18 inserted in its bottom recesses, the first partition sheet 17 placed thereover, the second mandrel placed over that, and so on until the stack is complete, after which the free portions of the side-forming sheet are wrapped around the remaining three sides of the stack of mandrels and its edges brought together in the middle of the upper side to form a butt seam, the bottom-forming sheet 22 being then applied to complete the assembly. This assemblage of mandrel and work, together with the wedge-formed mold members 21, is then located in the lower one of the outer mold members 19 as indicated in Fig. 3, this view showing the wedge-formed members somewhat above their proper positions relatively to the jar 11. The top or cover member of the outer mold is then applied and the entire mold is placed between the plates of a suitable press which squeezes the parts together, while heat for vulcanizing is supplied in any suitable manner. The bringing together of the mold members 19 exerts vertical compression in the usual way between said members, the mandrels and the work, and in addition draws the wedge-formed members 21 horizontally inward against the work, thus exerting perpendicular horizontal compression which perfects the seams or joints between the partitions 17 and the vertical sides of the jar without producing an injurious flow of the stock, and without requiring the usual amount of excess stock to secure proper distribution. In addition to the perpendicular pressure which they exert at the sides, the wedge-formed members 21 also provide a greater contraction than heretofore of the space containing the bottom-forming sheet 22, and consequently the bottom seams or joints receive the proper compression by the provision of a relatively-small excess of stock which finds an outlet in the overflow grooves 25, 26.

The invention applies to jars having one or more partitions, and the described embodiment may be variously modified without departing from the scope of the claims.

I claim:

1. A vulcanizing mold for plural-compartment rubber jars comprising a series of mandrels having suitable surfaces for receiving the side-forming, bottom-forming and partition-forming sheets of stock, and an outer mold including a member movable edgewise of the partition space or spaces between the mandrels.

2. A vulcanizing mold for plural-compartment rubber jars comprising a series of mandrels having suitable surfaces for receiving the side-forming, bottom-forming and partition-forming sheets of stock, and an outer mold including side members relatively movable toward each other edgewise of the partition space or spaces between the mandrels.

3. A vulcanizing mold for plural-compartment rubber jars comprising a series of mandrels having suitable surfaces for receiving the side-forming, bottom-forming and partition-forming sheets of stock, and an outer mold composed of body members adapted to be closed together and including a wedge-formed member and a complementally wedge-formed mold member adapted to be moved edgewise of the partition space or spaces between the mandrels by the closing together of said body members.

4. A vulcanizing mold for plural-compartment rubber jars comprising a set of mandrels having working portions spaced apart to receive the partition-forming stock and having outer surfaces for supporting the side-forming and bottom-forming stock, and an outer mold including a pair of wedge-formed body members adapted to close toward each other in a direction transverse to the plane of the partition space or spaces, and a pair of complemental wedge-formed mold members adapted to be moved toward the mandrels edgewise of said spaces by the closing together of said body members.

5. A vulcanizing mold for plural-compartment rubber jars comprising a set of mandrels having working portions spaced apart to receive the partition-forming stock and having outer surfaces for supporting the side-forming and bottom-forming stock, and an outer mold comprising a pair of body members each formed with a portion of the jar-receiving cavity and also provided with wedge-formed recesses adjacent to said cavity, and a pair of mold members located in said recesses and each formed as two wedges placed base-to-base and movable toward each other by the closing together of said body members, whereby perpendicular pressure is exerted by the outer mold on all four sides of the work.

6. A vulcanizing mold for plural-compartment rubber jars comprising a series of mandrels having suitable surfaces for receiving the side-forming, bottom-forming and partition-forming sheets of stock, an outer mold including a pair of wedge-formed body members adapted to exert pressure perpendicular to the plane of the jar partition or partitions, and a pair of complementally wedge-formed members movable toward each other by the closing movement of said body members, and adapted to exert pressure on the work edgewise of the partitions, said wedge-formed members being extended to cover two opposite edges of the bottom-forming space between the mandrels and the body members of the outer mold.

7. A vulcanizing mold for plural-compartment rubber jars comprising a set of mandrels having working portions spaced apart to receive the partition-forming stock and having outer surfaces for supporting the side-forming and bottom-forming stock, and an outer mold including a pair of wedge-formed body members adapted to exert pressure perpendicular to the jar partition or partitions, and a pair of complemental wedge-formed members movable toward each other by the closing movement of said body members and adapted to exert pressure on the work edgewise of the partitions, said wedge-formed members extending longitudinally beyond the mouth end of the jar-forming space and having flanges extending inwardly toward the mandrels over two opposite mouth edges of said space.

In testimony whereof I have hereunto set my hand this 15th day of November, 1918.

EDWIN J. KROEGER.